July 28, 1936.  H. H. CHAPIN ET AL  2,049,194
INSECTICIDE DISTRIBUTOR
Filed Nov. 19, 1932
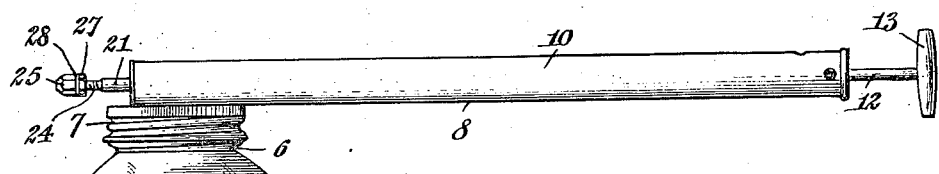
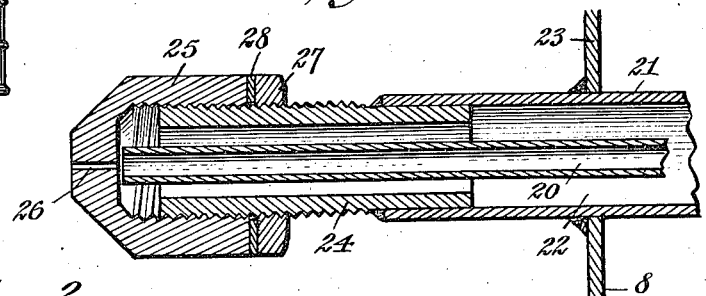
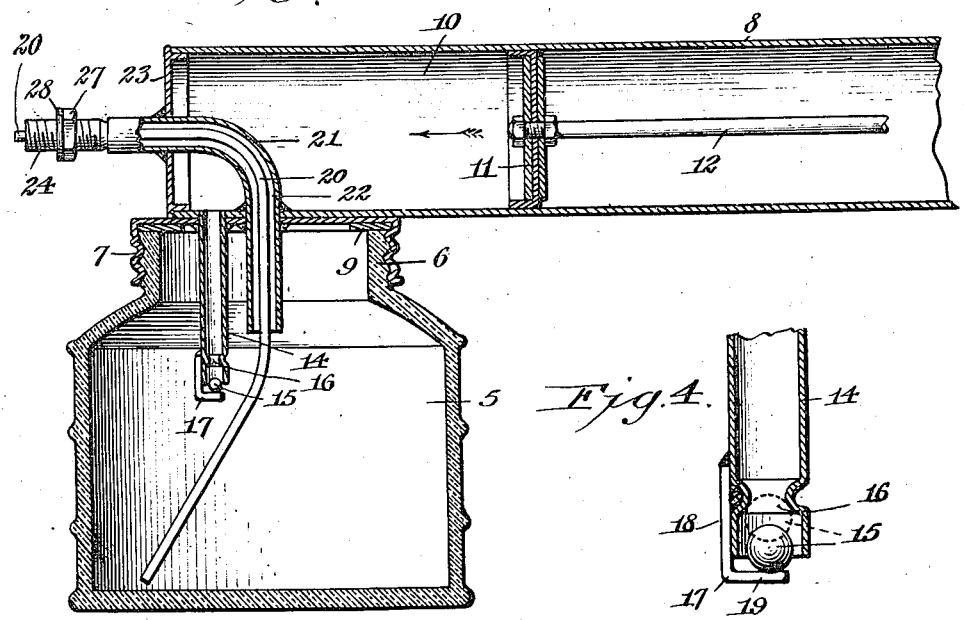
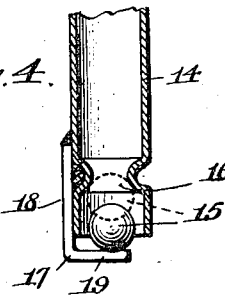
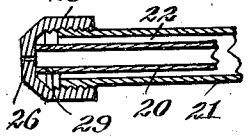
Horace H. Chapin,
Don E. MacDonald, Inventors
By Emil Kuehart, Attorney.

Patented July 28, 1936

2,049,194

UNITED STATES PATENT OFFICE 2,049,194

INSECTICIDE DISTRIBUTOR

Horace H. Chapin and Don E. MacDonald, Batavia, N. Y., assignors to The R. E. Chapin Mfg. Works, Batavia, N. Y., a copartnership composed of Ralph E. Chapin, Florence A. Chapin, and Horace H. Chapin Application November 19, 1932, Serial No. 643,426

5 Claims. (Cl. 43—147)

Our invention relates to insecticide distributors, and more particularly to a device capable of distributing liquid insecticides, or powdered insecticides, and other similar substances.

We therefore refer to the invention more particularly as a combined spraying and dusting device, and it has for one of its objects to provide a simple and effective device whereby liquid insecticide, liquid disinfectants, and other liquid substances may be sprayed; or, when desired, powdered or dust-like insecticide or other powdered substances may be distributed.

Another object of our invention is the provision of a combined sprayer and duster capable, in its complete form including all elements of the device, of being employed as a liquid sprayer, and upon removal of one element, more particularly a nozzle member, the device may be used as a duster for distributing powdered or dust-like substances.

A further object of our invention is the provision of new and novel means whereby liquid insecticide or powdered insecticide may be distributed from the device through one and the same exit member; it being only necessary to apply an auxiliary element having a restricted exit opening when it is desired to spray liquid insecticide or other liquid substances.

A still further object of our invention in its preferred form is the provision of a simple and inexpensive device in which compressed air is utilized as a means for ejecting either a liquid substance or a powdered substance from the container of the device, and wherein the container can be easily emptied and refilled so that liquid or powdered substances can be distributed interchangeably.

With the above and other objects in view to appear hereinafter, the invention consists in providing an exit or distributor member having two passages, one of which is utilized for the discharge of liquid insecticide or other liquid substances when contained in the container or receptacle of the device, and the other for the discharge of a powdered or dust-like insecticide or other similar substance; these passages being preferably, but not necessarily, arranged in the form of tubes of different diameters, one of which extends through the other and is surrounded by space, an adapter being utilized in connection with the tubes to restrict the exit opening of one tube and provide a proper exit opening for the other.

The invention further consists in the novel features of construction, and in the arrangement and combination of parts to be hereinafter described and more particularly pointed out in the subjoined claims.

In the drawing:

Fig. 1 is a side elevation of the device.

Fig. 2 is a longitudinal section on an enlarged scale through one end of the device, showing the pump-plunger within the pump cylinder; the liquid-spraying nozzle being removed from the distributing member.

Fig. 3 is a still further enlarged longitudinal section through the distributor tubes of the device, the liquid-spraying nozzle being applied thereto.

Fig. 4 is an enlarged vertical section through the lower end of the valve-controlled air-inlet tube arranged in depending form within the insecticide container.

Fig. 5 is a longitudinal section through the distributor tubes of the device, the liquid spray nozzle being applied thereto, said liquid distributor tubes being provided with modified means for restricting the escape opening of the outer or powdered discharge tube.

Having more particularly reference to the drawing in detail, the numeral 5 designates a container for liquid insecticide, or a powdered insecticide; either being used in the care or treatment of flowers, plants, shrubbery and the like.

Although we have shown the container as being formed of glass, any other material suitable for the purpose may be used. In the form illustrated, the container has an externally screw-threaded neck 6 at its upper end onto which is threaded a closure in the form of a cap 7. This cap has one end of a pump 8 overlying the same, which is soldered or otherwise secured thereto in any approved manner, and between the flat top wall of the cap and the upper edge of the neck 6 of the container a gasket 9 is interposed, thus rendering the container liquid-tight and air-tight when the cap 7 is applied thereto.

The pump may be of any common construction, and in the drawing this pump is shown as comprising a pump cylinder 10 in which a plunger 11 of any approved construction is arranged for reciprocable movement, a plunger rod 12 being secured thereto and projected from the distant or inner end thereof in the usual manner, the free end of said plunger rod having a handle 13 secured thereto for conveniently operating the pump.

Connecting the interior of the plunger cylinder 8 with the container 5 is an air-inlet tube 14, which is passed through the wall of the plunger casing and through the cap 7 of the container, and soldered or otherwise secured thereto in a rigid manner. This tube extends downwardly from the cap a distance and has an inwardly-closing ball valve 15 at its lower end adapted to be drawn upwardly under suction against a valve seat 16, formed in the air-inlet tube by restricting the diameter of the tube to provide an internal bead, or otherwise. This ball valve is normally in open position under gravity, and it is held against displacement from the tube by a valve stop 17, comprising an angular bar having a vertical arm 18 lying against the outer side of the tube 14 and soldered or otherwise secured thereto, and a horizontal arm 19 which extends in a diametral direction across the lower open end of the tube in slightly spaced relation thereto. The ball valve normally rests upon the horizontal arm of this valve stop and allows air to be forced from the pump cylinder into the container 5 during the movement of the plunger 11 in the direction of the arrow shown in Fig. 2.

When the plunger is moved in an opposite direction, suction is created wtihin the air-inlet tube and the ball valve 15 drawn against the valve seat 16 to prevent exhausting the air from the container through the air-inlet tube. Air is consequently forced into the container by the pump 8 and stored up therein so as to act under pressure against the liquid insecticide, or the powdered insecticide, as the case may be, confined within the container.

An exit or distributor member is provided with two passages which connect the interior of the container with the atmospheric air. This distributor member comprises two separate and distinct conduits or passages, preferably in the form of tubes 20, 21 of different sizes arranged one within the other, the inner tube 20 being separated from the wall of the outer tube by an intervening space 22 and so held in any approved manner. These tubes are curved to provide a horizontal portion and a vertical portion for each, which are connected by a curved portion, the vertical portions of these tubes extending through the peripheral wall of the pump cylinder 10 and through the cap 7 of the container, while the horizontal portions pass through the end wall 23 of the pump cylinder. The curved portions of these tubes are wholly within the pump cylinder.

The outer tube 21 opens directly into the container 5 a considerable distance from the bottom thereof, while the inner tube 20 terminates in close proximity to the bottom of the container, the lower portion of this inner tube being laterally deflected and its lower end therefore closely approaches the side wall of the container in a forward direction so that when the device is inclined downwardly, as when spraying low flowers or plants, and the liquid insecticide or other material within the container is almost exhausted therefrom, the inner extremity of the inner tube will nevertheless be fully submerged within the liquid, which will be forced outwardly under pressure of the air delivered into the container by the pump.

We have provided a nipple 24 at the outer end of the outer tube 21, which is entered in the latter and soldered or otherwise secured thereto; the inner tube 20 being continued through this nipple and slightly beyond the outer end thereof.

When liquid insecticide, a liquid disir. ctant, or any other liquid substance is to be distributed by means of this device, a nozzle 25 is applied to the screw-threaded outer end of the nipple 24 and positioned in slightly spaced relation to the outer extremity of the inner tube 20; this nozzle having a comparatively small liquid exit opening 26 arranged in its outer end wall co-axially with the inner tube 20. This nozzle is held in place on the nipple 24 by means of a jamb nut 27, between which and the inner end of the nozzle a gasket 28 is arranged, and it is therefore adjustable to regulate the space between it and the end of the inner tube.

It is to be understood that the inner tube 20 is utilized as the liquid-distributing or spraying tube, while the outer tube 21 is utilized as the powder-distributing or duster tube, by means of which powdered or fine granular material is distributed. All parts of the device remain unchanged in their relative positions, excepting only the liquid-spraying nozzle 25 which is removed when it is desired to distribute powdered, fine granular, or dust-like material.

In Fig. 2 we have shown the nozzle removed from the device, and in this form, under compression of the plunger in the pump, air is forced into the container 5 through the air-inlet tube 14 when said plunger is moved in the direction of the arrow shown in Fig. 2. When, under reciprocation of the plunger, the plunger is moved in a reverse direction, suction created forward of the plunger draws the ball valve 15 upwardly against its seat so as to prevent exhausting the air from the container. Thus, the ball valve 15 is reciprocated upwardly and downwardly within the air-inlet tube in conformity with the reciprocating movements of the pump plunger, and pressure is built up in the container so that the material to be sprayed or dusted, as the case may be, will be ejected in a constant or continuous manner.

When liquid is contained within the container 5, the air compressed within the container will force liquid out through the inner or liquid-discharge tube 20 without any possibility of the liquid being forced through the outer tube 21, due to the fact that the outer tube terminates at its inner or lower end above the liquid within the container and consequently admits only air, which passes through the outer tube and commingles within the nozzle with the liquid forced out of the inner or liquid-discharge tube. Therefore, when the nozzle 25 is applied to the outer tube 21 with its end wall positioned in close proximity to the outer extremity of the inner tube 20, as shown in Fig. 3, liquid will be forced out of the container through the inner or liquid-discharge tube 20, and this air, by reason of its traveling toward the escaping liquid, will create the desired spray of the liquid as it escapes from the exit opening of the nozzle, the fineness of spray and the area of distribution of the spray being regulated by adjustment of the nozzle 25 on the nipple 24.

Any other means may be provided for introducing the air to the column of liquid escaping from the outer end of the inner tube 20, such as the provision of a small aperture or apertures 29 through the wall of the inner tube near its outer or discharge end, in which case the end wall of the nozzle will abut against the outer extremity of the inner tube 20, and thus restrict the escape opening at its outer end of the outer or powder discharge tube to the area of the aperture 29, or the areas of the apertures 29, as the case may be, but in such case no provision is made for regulating the spray.

When it is desired to provide the container with a dust or powder insecticide or other powdered or granular dry material, the liquid spray nozzle 25 is removed from the nipple 24, which latter may be considered as forming part of the outer tube 21, and thus both the outer end of the inner or liquid-discharge tube 20 and the outer end of the outer or powder-discharge tube 21 are open to their full extent to atmospheric air. Under such conditions, air will be forced into the container 5 under pressure by the pump and will loosen the dust or powdered substance at the top and cause the fine loosened particles to be held, or moved about, in suspension, with the result that the air maintained under pressure within the container will force the loosened dust or powdered material out through the outer tube 21; this dust escaping from the outer extremity of the nipple, or outer tube more broadly considered, and being distributed over any desired area, particularly since the outer end of the inner tube 20 extends somewhat beyond the outer end of the nipple 24, or outer tube broadly considered. The device is therefore one which will as effectively spray liquid material as powdered, dust, or fine granular material; it being merely necessary to convert the device for use for one purpose into the other by removing, or applying, the nozzle 25. The device is therefore simple to operate and may be used interchangeably as a duster or a liquid spraying device.

In the drawing we have shown our invention as applied to a continuous spraying or dusting device, wherein liquid insecticide or other liquid substances, or dust or powdered insecticide or other like material, will be ejected from and distributed by the nozzle of the device under continuous force, as distinguished from the ordinary device in which reliance is placed solely on the compression force applied by the pump without resorting to the storage of compressed air for constant action against the material to be ejected.

It is, however, our intention to utilize our invention in connection with an intermittent spraying, or dusting device, such as solely depends on the compression force of the pump; and our invention may also be embodied in double-action spraying devices and in spraying or dusting structures of various kinds without departing from the spirit of the invention as set out in the appended claims, and without sacrificing any of the advantages thereof.

It is to be understood that with the nozzle 25 removed from the nipple 24 or, broadly considered, from the outer end of the powder-discharge tube, said liquid-discharge tube is ineffective for conveying any of the powdered substance when the container is supplied with such substance, and is not rendered effective for conveying liquid until the discharge area at the outer end of the outer or powder-discharge tube is restricted. However, said liquid-discharge tube is highly effective in connection with the outer tube in that it serves, by reason of its axial position in said outer tube, to form a comparatively small annular space through which the powdered substance is forcibly directed, and the end of the liquid-discharge tube, especially when extended beyond the outer end of the powder-discharge tube, acts as a diffuser for the powder.

It will therefore be clear from the foregoing, that liquid can be discharged through the liquid-discharge tube 20 upon closing or restricting the outer end of the powder-discharge tube 21, and that a somewhat smaller discharge or exit opening than provided by the liquid-discharge tube 20 is desirable, and we therefore provide a nozzle which, in addition to serving as a spraying nozzle, also serves as a closure or regulator for the outer or powder-discharge tube. By providing this nozzle with a comparatively small exit or discharge opening, such for example as shown at 26, a finer spray is assured than would be possible by having the liquid discharge directly from the outer end of the liquid-discharge tube 20. Nozzles of various kinds may be employed, depending on the nature of the spray and the area to be covered, it being quite clear that the smaller the exit opening 26 in the nozzle, the finer will be the spray and the greater the area covered, although the distance of projection will be diminished; and this, taken in connection with the adjustment of the nozzle 25 on the nipple 24, provides maximum variation in kind and area of projection.

It may here be stated, that when the nozzle 25 is applied to the nipple 24, what we have termed a "powder-discharge" tube becomes an air-discharge tube and the annular passage 22 between the wall of said tube and the inner tube 20 serves as an air passage.

For the purpose of this invention, the nozzle 25 is, in a broad sense, to be considered as a part of the tube or nipple 24.

Having thus described our invention, what we claim is:

1. In an insecticide distributor, the combination of a container having a cap applied to its upper end, a pump secured to said cap and extending radially therefrom, an air inlet-tube connected to said pump and extending through said cap into said container, and two tubes arranged one within the other and having opposite ends extending from said pump, said tubes having their intermediate portions extending angularly through said pump and having corresponding ends extending different distances into said container and their other ends opening into atmospheric air.

2. In an insecticide distributor, the combination of a container having its upper end open and externally threaded, a cap threadingly secured to said container, a pump having a pump cylinder secured to the upper surface of said cap and extending radially therefrom, an air-inlet tube secured to said pump cylinder and extending into said container, an angular tube extending through said pump cylinder and projecting from the peripheral wall thereof through said cap into said container and also from the end wall of said pump cylinder, said tube having its angular portion within said pump cylinder, a second angular tube extending through said first mentioned angular tube and having one end entered in said container so as to terminate near the bottom thereof and its other end terminating adjacent the outer end of said first-mentioned angular tube, said angular tubes being separated by an annular passage through which powder-insecticide may be forced and the outer end of said inner tube serving as a diffuser for said powder-insecticide, and means capable of being applied to said first-mentioned tube to cause the same to serve as an air tube and to convert said second tube into a liquid-discharge tube.

3. In an insecticide distributor, the combination of a container having its upper end open, a cap removably applied to said upper end to close said container, a pump having a pump cylinder mounted on and secured to said cap and disposed crosswise thereon, an air-inlet tube secured in the peripheral wall of said pump cylinder and extending through said cap into said container, two tubes arranged one within the other and disposed within said pump cylinder, portions extending through the end of said pump cylinder and portions extending through the peripheral wall of said cylinder and through said cap to enter said container, the inner of said tubes terminating at a lower level than the outer and serving to restrict the opening in said outer tube and as a diffuser for the exit end of said outlet tube.

4. An air pressure distributor, comprising a container adapted to contain a liquid substance, means to introduce air under pressure to said container, including a pump having a cylinder extending radially a considerable distance from said container in one direction, a distributing member comprising two tubes arranged axially one within the other and having intermediate portions extending angularly through one end of said pump cylinder with corresponding end portions projecting axially from the end of said pump cylinder and the remaining end portions projecting into said container, the outer of said tubes terminating with its inner end within said container a considerable distance above the bottom thereof and the inner of said tubes being bent within said container to terminate with its inner end off-center therein in a direction opposite that in which said pump cylinder extends, and a nozzle having a perforation in its end wall secured to the outer end of said outer tube and having said end wall in close juxtaposition to the outer end of said inner tube.

5. An insecticide distributor, comprising a container having a single opening to supply said container with insecticide in powdered or liquid form, an air pump having a cover rigid therewith to form a unitary structure and to close said opening, communicating means between said pump and said container, two tubes carried by said unitary structure and insertable different distances into said container when applying said cover to the latter, said tubes extending outwardly from said unitary structure at corresponding ends whereby powdered insecticide may be distributed, and means detachably applied to one of said tubes to enable liquid insecticide to be sprayed therefrom.

HORACE H. CHAPIN.
DON E. MacDONALD.